Patented Feb. 20, 1945

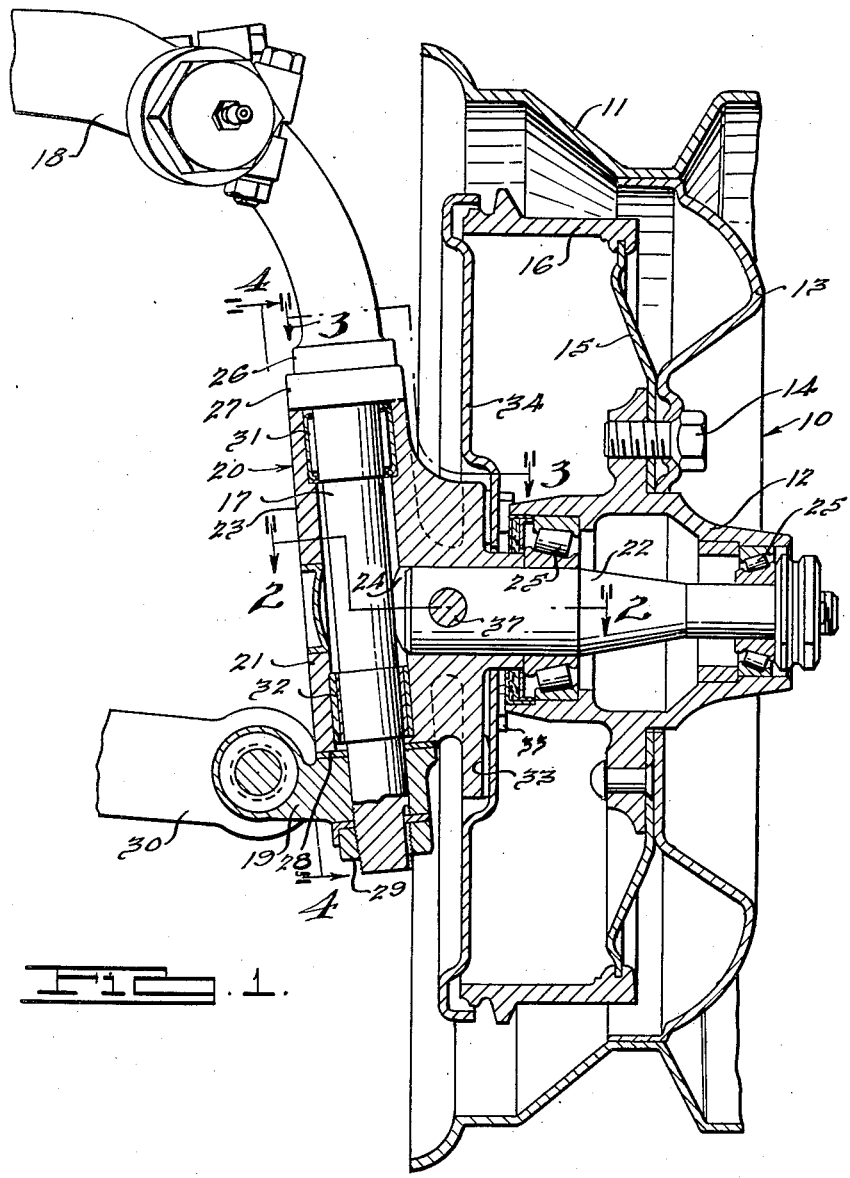

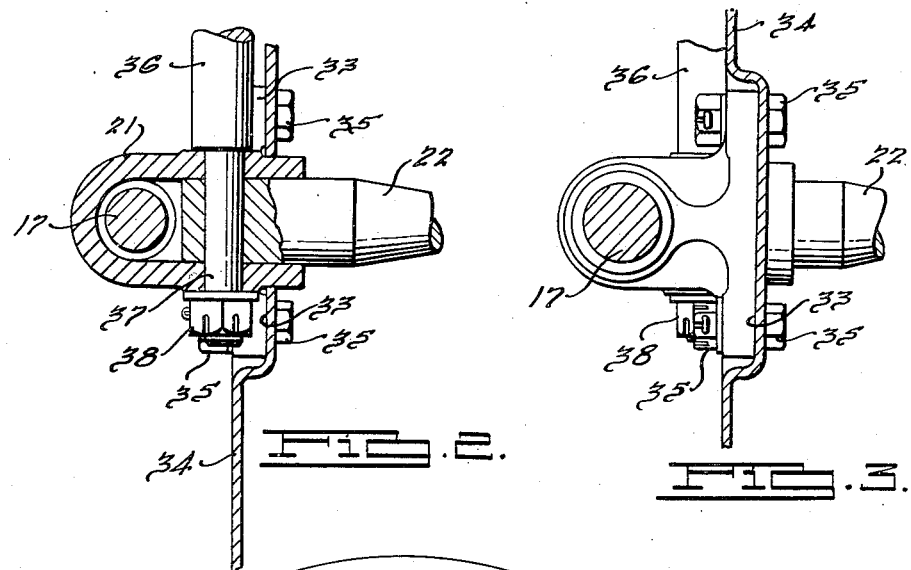
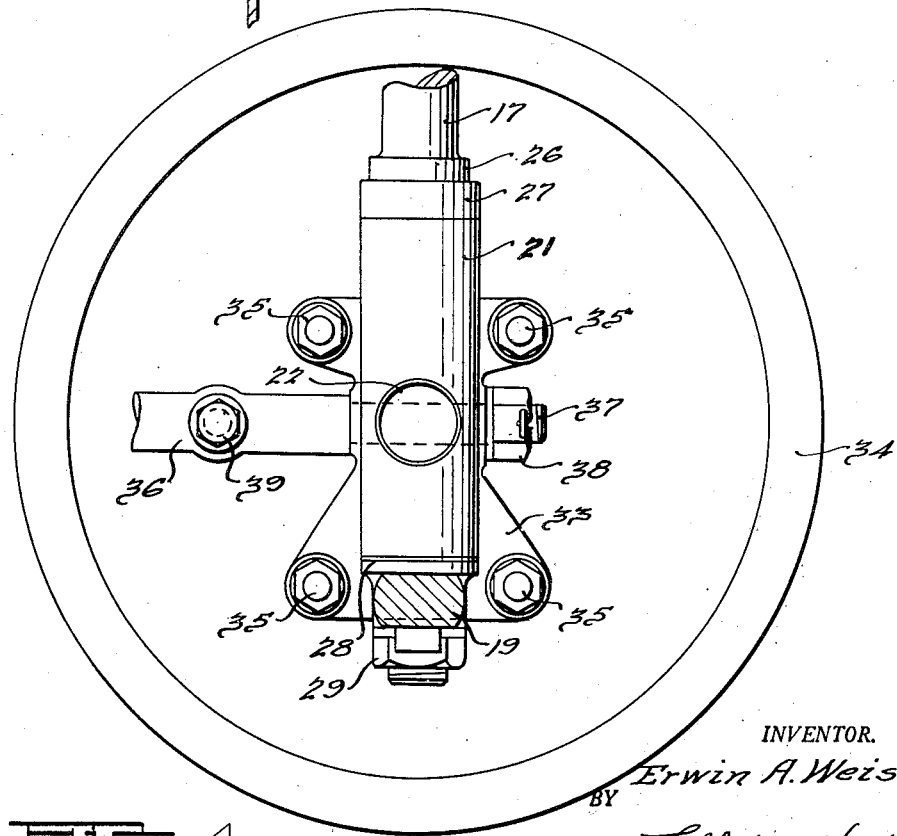

2,370,098

UNITED STATES PATENT OFFICE 2,370,098

MOTOR VEHICLE

Erwin A. Weiss, Detroit, Mich., assignor to Packard Motor Car Company, Detroit, Mich., a corporation of Michigan Application August 14, 1943, Serial No. 498,704

6 Claims. (Cl. 280—96.1)

This invention relates to vehicles and more particularly to steering wheel supporting structure.

An object of the invention is to reduce the cost of steering knuckle structures for wheels.

Another object of the invention is to provide a steering knuckle structure for wheels composed of a knuckle member and a spindle that can be fabricated separately and readily assembled.

Still another object of the invention is to provide a knuckle structure for wheels in which the spindle is formed separately as a forging or from a bar of metal stock.

Another object of the invention is to provide a steering knuckle structure for wheels in which a knuckle member and spindle are secured together by a pressed fit and are locked together by a portion of the steering mechanism.

Other objects of the invention will appear from the following description taken in connection with the drawings, which form a part of this specification, in which:

Fig. 1 is a vertical sectional view of a wheel and its supporting structure incorporating the invention;

Fig. 2 is a sectional view of the knuckle structure taken on line 2—2 of Fig. 1;

Fig. 3 is another sectional view of the knuckle structure taken on line 3—3 of Fig. 1;

Fig. 4 is a side elevation taken approximately on line 4—4 of Fig. 1 showing the steering mechanism and the wheel and knuckle structures.

A conventional motor vehicle wheel structure 10 is shown comprising a rim 11, hub 12 and disk 13 connecting the rim and hub. The disk can be welded to the rim and secured to the hub by bolts 14, and such bolts can also serve to secure the flange 15 of a brake rim 16 to the hub.

The wheel supporting structure comprises a king or swivel pin 17, an upper link 18, a lower link arm 19 and a knuckle structure 20.

The knuckle structure consists of a knuckle member 21, preferably in the form of a metal casting, and a wheel supporting spindle 22. The knuckle member has a cylindrical portion with a vertically extending opening 23 therethrough and another portion offset from the cylindrical portion having a substantially horizontally extending opening or socket 24 therein. The spindle 22 is formed of metal bar stock or as a forging and can be inserted into socket 24 in the knuckle casting. The spindle can be tightly fitted in the casting socket by expanding the casting when inserting the spindle in the socket or by shrinking the spindle before inserting it into the socket. Suitable roller bearings 25 are arranged between the spindle portion projecting from the socket and the wheel hub.

The swivel pin 17 extends through the vertically extending opening in the knuckle member and is formed with a flange 26. Between flange 26 and the top of the knuckle casting is arranged a ball thrust bearing 27. The lower support link arm 19 bears against a washer 28 that engages the bottom of the knuckle casting and nut 29 is screwed on the lower end of the swivel pin to secure the arm and casting in desired relation. A lower supporting link 30 is pivotally connected to arm 19 and the upper link 18 is pivotally connected to the upper end of the swivel pin, the links being pivotally connected to a vehicle frame (not shown). Roller bearing 31 is arranged between the upper end portion of the knuckle casting and the swivel pin while a plain bearing 32 is arranged between the lower end portion of the knuckle casting and the swivel pin.

The offset portion of the knuckle casting has a flanged side 33 to which the brake backing or cover plate 34 is secured by bolts 35.

The wheel is arranged to be turned for steering by an arm 36 forming part of a conventional steering mechanism (not shown). The arm is formed with a reduced diameter end portion 37 that extends through registered openings in the offset portion of the knuckle casting and the spindle end portion in the casting socket. Nut 38 is screwed on the end of the reduced portion of the steering arm to secure it in position and a bolt 39 provides means for securing arm 36 to brake cover plate 34. The steering arm will thus lock the spindle in the knuckle casting.

By forming the knuckle member as a casting and the spindle from bar stock or as a forging, the wheel supporting structure can be fabricated at a lower cost than the usual one piece forged structure.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. A steering wheel supporting structure comprising a knuckle member having a socket portion, a wheel spindle projecting into and secured to the socket portion of the knuckle member, a steering arm projecting through the socket portion of the knuckle member and the end of the spindle in the socket portion of the knuckle member, and means securing the steering arm in the specified relation.

2. In a steering wheel supporting structure, a knuckle member having a socket portion, a brake cover plate fixed to said member, a separately formed spindle extending into the socket portion of the knuckle member, a steering arm extending through the socket portion of the knuckle member and the spindle, means fixing the arm in the specified relation, and means securing the arm to the brake cover disk.

3. In a steering wheel structure, a cast knuckle member having a vertically extending opening and two horizontal intersecting openings, a swivel pin mounted in the vertically extending opening in the member, a spindle projecting into one of the horizontal openings in the member, a steering arm extending through the other horizontal opening in the member and through the spindle, and means securing the arm in said relation with the arm and the member.

4. A steering wheel supporting structure comprising a knuckle member having a socket portion, a wheel spindle having an end fitted in the socket portion of the knuckle member, and securing means projecting through the socket portion of the knuckle member and the end of the spindle in the socket portion of the knuckle member.

5. A steering knuckle structure comprising a knuckle member having a king pin opening extending therethrough, said knuckle member having an offset portion with a horizontally extending socket outside of the king pin opening, and a wheel spindle member having one end secured in the opening in the offset portion of the knuckle member.

6. A steering knuckle structure comprising a cast knuckle member having a vertically extending cylindrical portion with a king pin opening and an extension with a horizontal socket beyond the opening, and a wheel spindle formed of bar stock having an end fixed in the socket in the knuckle extension.

ERWIN A. WEISS.